March 22, 1960  J. R. RUSSELL ET AL  2,929,429
TUBELESS TIRES HAVING AN AIR IMPERVIOUS
GRAFT POLYMER INNERLINER
Filed June 3, 1955
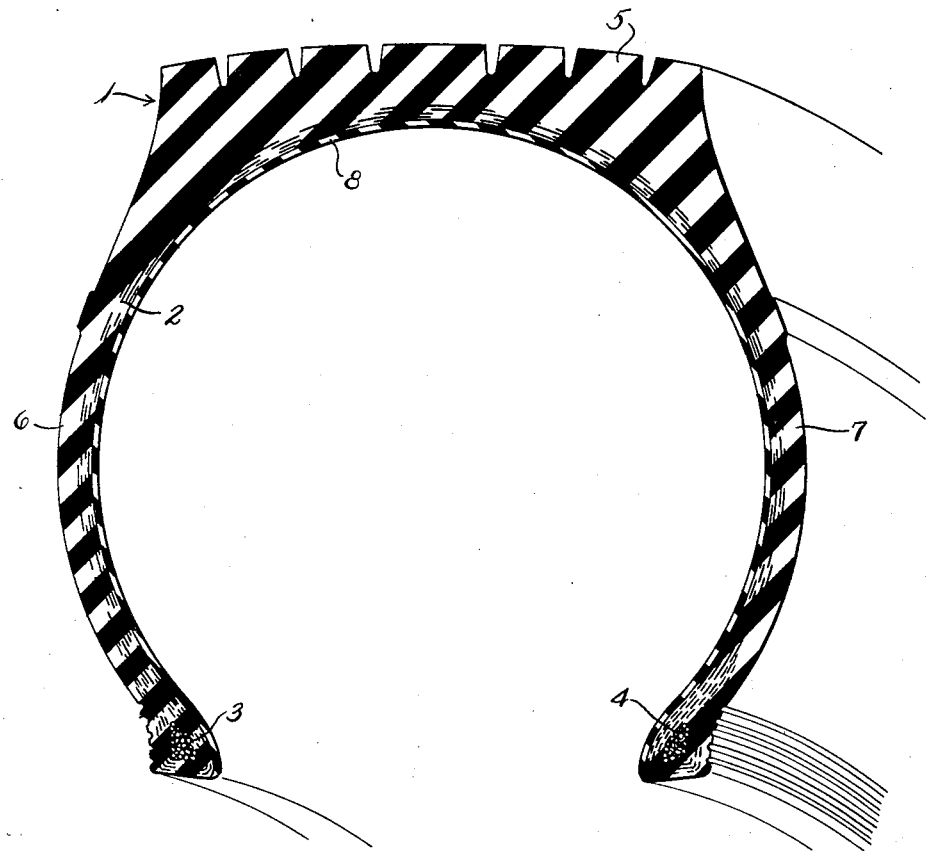
INVENTORS
JOHN R. RUSSELL
MICHAEL J. FORSTER
BY W. A. Fraser
ATTY.

2,929,429

TUBELESS TIRES HAVING AN AIR IMPERVIOUS GRAFT POLYMER INNERLINER

John R. Russell and Michael J. Forster, Akron, Ohio, assignors to The Firestone Tire & Rubber Company, Akron, Ohio, a corporation of Ohio Application June 3, 1955, Serial No. 513,026

1 Claim. (Cl. 152—330)

This invention relates to gas impervious liners for pneumatic containers such as pneumatic tubes and tubeless tires.

For example, in the manufacture of pneumatic containers such as tubeless tires adapted to support the vehicle load without an inner tube, it is necessary to line the air cavity of the tire or tube with an air impervious material. For years, natural rubber was used for such a purpose but butyl rubber was discovered and was adopted for this purpose because of its property of being highly impervious to air. Butyl rubber is a rubbery copolymer of a polyisobutylene and isoprene copolymerized at a low temperature in the presence of a Friedel-Craft catalyst such as aluminum chloride. However, butyl rubber was not entirely satisfactory for the air cavity lining of tubeless tires for the reason that such tires are composed of vulcanizable rubbery polymers and copolymers to which butyl rubber does not readily adhere. To properly adhere a butyl lining to the inner peripheral surface or band ply of a tubeless tire, it is necessary to dilute the butyl rubber with adhesion producing materials such as natural rubber with the result that the lining does not have the desirable air retention properties of butyl rubber itself.

The present invention provides a rubbery lining for pneumatic containers such as tubeless tires by use of a graft polymer of natural rubber with an unsaturated acrylate. The novel liner has adhesion and resistance to the passage of air better than the adhesion and resistance to passage of air of prior art natural rubber inner liners.

It is therefore an object of this invention to provide a rubbery lining for pneumatic containers having improved adhesion to the other rubbery components of such containers.

It is a further object of the invention to provide an air impervious lining for a tubeless tire comprised of a graft polymer of natural rubber and an unsaturated acrylate.

Yet another object of the invention is to provide an air impervious lining for a tubeless tire comprised of a graft polymer of natural rubber and methyl methacrylate.

These and other objects of the invention will be more fully understood with reference to the following specification, claim and drawing of which:

The figure is a sectional view of a tubeless tire embodying the novel inner liner.

With reference to the figure, a tubeless tire generally indicated at 1 is comprised of an annular open bellied fabric body portion 2 terminating at its two edges in inextensible bead portions 3 and 4. Rubber abrasion resistant tread portion 5 is adhered by vulcanization to body 2 while two sidewall portions 6 and 7, extend from each edge of the tread portion to the respective beads along the body portion 2 to which they are adhered by vulcanization. To make the annular body portion 2 an air container, a thin air impervious inner liner 8 is adhered to its inner peripheral wall surface.

In the preferred form of the invention, a rubbery compound was prepared according to Formula B, all parts based on 100 parts by weight of polymer:

|  | A | B |
|---|---|---|
| Natural Rubber | 100 |  |
| Graft Polymer—100 parts Hevea, 25 parts Methyl Methacrylate |  | 100 |
| Carbon Black | 50 | [1] 50 |
| Stearic Acid | 3 | 3 |
| Petroleum Softener | 5 | 5 |
| Zinc Oxide | 3 | 3 |
| Sulphur | 2 | 2 |
| Accelerator | 1.2 | 1.2 |
|  | 164.2 | 164.2 |

[1] All weights based on 100 parts of graft polymer.

Compounds according to the above formulae were mixed on conventional rubber mixing machinery, formed into slabs having a dimension of 6 x 9 x .030 inches which were in turn cut into two test pieces 6 x 4.5 x .030 inches. One such piece was clamped to form a partition between two air chambers having a differential air pressure of 46 lbs. The test sample, air and air container were held at a temperature of 60° C. The change in air pressure between the chambers is observed over a period of two and one half hours and is calculated as the permeability expressed in cubic centimeters of air per second passing through a sample one centimeter thick and one centimeter wide, when the difference in pressure is 14.7 lbs. per square inch or one bar.

Tested under these conditions, the above stocks showed the following permeability to the passage of air:

| A | B |
|---|---|
| 1.77 | 1.30 |

It will be seen from the above that the novel inner liner composition resisted the passage of air to a greater degree than of the prior art all rubber inner liner. The preparation of natural rubber-methyl methacrylate graft polymers is accomplished by polymerization of rubber latex in the presence of methyl methacrylate. Polymerization of the methyl methacrylate occurs at the same time as the polymerization of the rubber, and in the presence of a catalyst such as benzoyl peroxide, a polymer is formed which can be readily compounded and cured. Such polymers and their preparation are discussed in an article Graft Polymers Derived from Natural Rubber, paper #50, Third Rubber Technology Conference, London, June 22–25, 1954.

A tubeless tire having an inner liner 8 of the novel composition adhered to the surface of the band ply from bead to bead has better air containing characteristics than prior art tubeless tires. Also, the inner liner has better adhesion to the rubbery material of the tire body than had the prior art inner liners.

In the preferred form of the invention, the graft polymer methyl methacrylate with natural rubber is used. Other acrylates workable with the invention are ethyl acrylate and methyl acrylate as well as others.

Although a preferred form has been shown, it will be obvious to one skilled in the art that modification may be made within the scope of the invention.

In the claim:

A tubeless tire having a hollow annular open bellied vulcanized rubberized fabric portion terminating at each edge in inextensible bead portions, a rubbery tread portion superimposed as by vulcanization to the outer periphery of said fabric portion, and a rubbery air impervious liner adhered to the inner periphery of said fabric portion extending from bead to bead to provide an air-tight chamber when the tire is mounted on a rim, said liner comprised of a graft polymer of natural rubber and methyl methacrylate.

References Cited in the file of this patent

UNITED STATES PATENTS

| | | |
|---|---|---|
| 2,388,905 | Compagnon et al. | Nov. 13, 1945 |
| 2,587,470 | Herzegh | Feb. 26, 1952 |
| 2,676,636 | Sarbach | Apr. 27, 1954 |
| 2,727,874 | Peterson et al. | Dec. 20, 1955 |
| 2,785,143 | Edgerly | Mar. 12, 1957 |
| 2,791,258 | Peterson et al. | May 7, 1957 |
| 2,825,382 | Peterson et al. | Mar. 4, 1958 |

OTHER REFERENCES

Rubber Chemistry & Technology, vol. 24, 1951, pp. 109–131.

"Rubber Developments," vol. 5, No. 2, 1952, pp. 34–38.